US006728896B1

(12) United States Patent
Forbes et al.

(10) Patent No.: US 6,728,896 B1
(45) Date of Patent: Apr. 27, 2004

(54) FAILOVER METHOD OF A SIMULATED OPERATING SYSTEM IN A CLUSTERED COMPUTING ENVIRONMENT

(75) Inventors: Steven Lee Forbes, Santa Margarita, CA (US); John Robert Cox, Aliso Viejo, CA (US); Amy Liu Miura, Laguna Niguel, CA (US); Jason Collins, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 519 days.

(21) Appl. No.: 09/892,276

(22) Filed: Jun. 26, 2001

Related U.S. Application Data (60) Provisional application No. 60/229,217, filed on Aug. 31, 2000.

(51) Int. Cl.[7] .................................................. H02H 3/05
(52) U.S. Cl. ............................................ 714/4; 714/11
(58) Field of Search ........................... 714/4, 6, 11, 12, 714/13; 711/162

(56) References Cited

U.S. PATENT DOCUMENTS

| | | | | |
|---|---|---|---|---|
| 5,218,679 A | * | 6/1993 | Hasegawa et al. | 710/16 |
| 5,633,999 A | * | 5/1997 | Clowes et al. | 714/6 |
| 5,812,748 A | * | 9/1998 | Ohran et al. | 714/4 |
| 5,860,122 A | * | 1/1999 | Owada et al. | 711/162 |
| 5,913,034 A | * | 6/1999 | Malcolm | 709/223 |
| 5,978,565 A | * | 11/1999 | Ohran et al. | 714/13 |
| 5,996,086 A | * | 11/1999 | Delaney et al. | 714/4 |
| 6,073,220 A | * | 6/2000 | Gunderson | 711/162 |
| 6,134,673 A | * | 10/2000 | Chrabaszcz | 714/13 |

* cited by examiner

*Primary Examiner*—Dieu-Minh Le
(74) *Attorney, Agent, or Firm*—Alfred W. Kozak; Mark T. Starr; Lise A. Rode (57) ABSTRACT

A system and method for managing a cluster of servers each of which operate on a first and second operating system, while enabling a single instance use of a single-licensed second operating system whose utilization is transferred to a second server when a first server has failed.

4 Claims, 6 Drawing Sheets

FAILOVER METHOD OF A SIMULATED OPERATING SYSTEM IN A CLUSTERED COMPUTING ENVIRONMENT

CROSS-REFERENCES TO RELATED APPLICATIONS

This application is based upon the U.S. Provisional Filing Serial No. 60/229,217 filed Aug. 31, 2000, and claims priority therefrom under 35 USC and 37 CFR 1.78.

This application may share subject matter with the following United States patents and/or applications, all of which are incorporated herein by reference:

U.S. Ser. No. 09/273,046, U.S. Pat. No. 6,351,782 entitled 'METHOD OF SHARING AN I/O DEVICE BETWEEN A HOST OPERATING SYSTEM AND A FOREIGN OPERATING SYSTEM IN A SINGLE COMPUTER";

U.S. Pat. No. 6,141,635, entitled "METHOD OF DIAGNOSING FAULTS IN AN EMULATED COMPUTER SYSTEM VIA A HETEROGENEOUS DIAGNOSTIC PROGRAM";

U.S. Pat. No. 6,128,679 entitled, "COMPUTER FOR EXECUTING I/O INSTRUCTIONS, BY EMULATION, IN A FOREIGN APPLICATION PROGRAM";

U.S. Pat. No. 5,794,011, entitled "METHOD OF REGULATING PERFORMANCE OF AN APPLICATION PROGRAM IN A DIGITAL COMPUTER";

U.S. Pat. No. 5,813,034, entitled "METHOD AND CIRCUITRY FOR MODIFYING DATA WORDS IN A MULTI-LEVEL DISTRIBUTED DATA PROCESSING SYSTEM"; and U.S. Pat. No. 6,223,260 B1, entitled "MULTI-BUS DATA PROCESSING SYSTEM WHICH ALL DATA WORDS IN HIGH LEVEL CACHE MEMORIES HAVE ANY ONE OF FOUR STATES AND ALL DATA WORDS IN LOW LEVEL CACHE MEMORIES HAVE ANY ONE OF THREE STATES.

FIELD OF THE INVENTION

This invention involves a clustering environment where multiple servers have shared storage and where the failure of one server can be accommodated by operations on a second server.

BACKGROUND OF THE INVENTION

In the art of computer systems, it is known to provide clustered computing environments. A "clustered" computer system can be defined as a collection of computer resources having some redundant elements. These redundant elements provide flexibility for load balancing among the elements, or for failover from one element to another, should one of the elements fail. From the viewpoint of users outside the cluster, these load-balancing or failover operations are ideally transparent. For example, a mail server associated with a given Local Area Network (LAN) might be implemented as a cluster, with several mail servers coupled together to provide uninterrupted mail service by utilizing redundant computing resource to handle load variations for server failures.

One difficult issue arising in the context of clustered computer systems is the licensing of the operating system or application software running aboard such systems. Typically, multiple-CPU or multiple-server licenses, that enable the licensee to run the licensed software on several systems concurrently, are more expensive than a single-CPU or single server license. Therefore, whenever possible, the system administrators responsible for clustered systems will favor installing software licensed under a "single-CPU license" in order to reduce license fees.

However, this approach can be problematic should the single server running the licensed software fail, in which case that software will become unavailable to the entire cluster, thereby defeating the purpose of implementing the cluster in the first place. Accordingly, there exists a pressing need in the art for a system enabling "single license-software" to run in a clustered environment while still taking full advantage of the load balancing and failover characteristics of clustered systems. The Unisys Corporation of Blue Bell, Pennsylvania, produces servers designated as ClearPath LX Servers, which offer a completely integrated heterogeneous small-type processor tower or rack-mounted server. These are provided with unique emulation architecture whereby each of the servers can combine two operating environments in a single platform, that is to say, the Unisys Master Control Program (MCP) and Microsoft's Windows 2000 Advanced Server.

The Unisys ClearPath LX Servers require no additional hardware other than what comes with the typical Unisys Intel platform which is running Microsoft Windows 2000 Advanced Server software to execute the Master Control Program (MCP) and associated User application. The LX Servers will still continue to execute code for both the Windows 2000 operating system, and also the MCP operating system.

The ClearPath LX software works to enhance the features and functionalities of already-provided LX software releases. These provide for: (i) open server flexibility, where integrated operating environments work concurrently to support both Windows 2000 Advanced Server and Unisys MCP operating environments; (ii) seamless client-server integration; (iii) scaleable computing with entry to mid-range enterprise server performance on current Intel processor technology; (iv) Open Industry Standards, where an enterprise server built on open standards, such as SCSI Ultra 802.3 (Ethernet) LAN interconnect, fibre channel connections with copper and optical interfaces, and open software interfaces.

The presently described system will utilize the LX platform which is comprised of two servers and one shared disk subsystem. A Virtual Machine for ClearPath MCP software is integrated with Microsoft Cluster Service (MSCS) via the MSCS API's and allow the Master Control Program (MCP) to failover on the clustered LX platform. The Virtual Machine for the MCP software will now have integrated the Microsoft cluster API's which then enables the Microsoft Cluster Services (MSCS).

Clustering is a useful and important function to many users by addressing and allowing customers to utilize clustering applications and increasing their reliability as is done in the present application. A higher quality and more reliable product is provided. Thus, with the use of two separate systems there is provided a certain amount of redundancy which together with the shared disk subsystems, makes accessibility and reliability a very primary element.

It may be understood that normally, internal disk drives do not "failover" to a standby system with Microsoft's clustering Services.

SUMMARY OF THE INVENTION

This invention provides a computer program product which is loaded onto a storage medium containing executable code that is readable by the computer and that programs the computer to perform method steps which operate on two separate servers having a shared disk resource.

The method involves executing a first operating system on a first server, which has a first and second operating system. Also, executing a first operating system on a second server and executing a second operating system on the first server as an application running under the first server. Then, the method detects any failure of the first server whereupon in response to the failure, the code transfers execution of the second operating system from the first server, to the second operating system of the second server.

Subsequently at some point afterwards, the code detects a re-starting of the first server, and in response to the re-start, it then returns the execution of the second operating system from the second server back to the second operating system of the first server.

The detection of failure and subsequent re-starting of the first server is done by sensing a "heartbeat" communication on a "Private Network" connection between the server systems. The disappearance of this heartbeat signal (from either of the server systems) will indicate a failure of that server system.

At any one time, the second operating system is executing itself on only one of the first servers or alternatively at the second server, thereby enabling the clustering environment to operate under the terms of a "single-server" or "single-CPU" license, while at the same time, realizing the benefits of cluster implementation.

GLOSSARY OF RELEVANT ITEMS

1. MSCS: MSCS refers to the Microsoft Cluster Server. This is software that supports the connection of two servers into a cluster for higher availability, easier manageability of data and application. It can automatically detect and recover from server or application failures, and can also move server workloads to a balanced utilization. A summary of this technology is shown in several Microsoft publications (a) *"Microsoft Cluster Server Administrator's Guide, Microsoft Windows NT Server, Enterprise Edition*, published by Microsoft Corporation 1997, *Document No. X0345521*; (b) *Microsoft Windows* 2000 *Server, Windows* 2000 *Clustering Technologies: Cluster Service Architecture White Paper*; published by Microsoft in 2000; (c) *Microsoft Windows* 2000 *Advanced Server Getting Started*, published by Microsoft Corporation, 1999, Part No. X05-12873." MSCS relies on the Windows™ network services for handling communication between nodes. Thus, little network overhead is required during normal operations. MSCS also relies on Windows security services to secure all node-to-node communication, including the forming of a cluster. Communication between the nodes of a cluster enables MSCS to detect the node failures, status changes, and to manage the cluster as a single entity. Nodes in a cluster communicate using their Cluster Services. The Cluster Service keeps track of the current state of the nodes within a cluster, and determines when a group and its resources should failover to an alternate node. This communication takes the form of messages that are sent regularly between the two nodes' Cluster Services, these message being designated as "heartbeats".

2. NODE: This designates a computer that is a member of a cluster.

3. RESOURCES: This designates physical or logical entities managed by the cluster.

4. DEPENDENCY: This involves the reliance between two resources that makes it necessary for both to run on the same node (computer).

5. GROUP: This involves a collection of related resources, or dependent resources.

6. FAILOVER: This involves the process of moving resources from one node (computer) to another node (computer) if a failure occurs.

7. FAILBACK: This involves the process of returning resources to the original node (computer) that was running before a failover occurred.

8. HEARTBEAT: In the Microsoft clustering system, the heartbeat is a message that is sent regularly by the Cluster Service on one node to the Cluster Service on the other node across a private network connection. This is part of the Microsoft Cluster Server technology. The disappearance of the heartbeat is assumed to imply a failure of the node.

9. QUORUM RESOURCE: This involves a resource that stores cluster management data, such as recovery logs for changes made to the cluster data. Generally, this must be a physical disk resource in the Microsoft cluster service system. Such recovery logs are often designated as "QUOLOG.LOG".

10. IDENTICAL NODES: Each node involves a physical platform and a master control program, whereby each node may involve a "primary" node and also a "secondary" (hot spare) node.

11. HALT/LOAD: This involves the stoppage or halting of computer operations during the case of a failover or a failback.

12. FIBRE CHANNEL: This is a type of transmission path used as an internal computer channel, as well as a network medium. It works with existing interfaces, such as IPI, SCSI, and HiPPI. In a Local Area Network it can be used as a high speed backbone. Speeds range up to 100 megabytes per second using optical fibre.

13. CLUSTERING: This is a situation where there is a use of two or more systems that work together. Generally, it refers to multiple computer systems that are linked together in order to handle variable workloads or to provide continued operation in the event that one fails. Each computer may be a multi-processor system itself. As an example, a cluster of four computers each with four CPUs, would provide a total of 16 CPUs processing simultaneously available. A cluster of computer systems provides fault tolerance and load balancing. If one system fails, one or more additional systems are still available. Load balancing distributes the workload over multiple systems.

14. VIRTUAL MACHINE (FOR CLEARPATH MCP): This is a set of software programs which emulates the hardware which would be involved in the Unisys Master Control Program. Thus, the MCP (Master Control Program) of Unisys can be run as an application on top of the Windows 2000 operating system.

DESCRIPTION OF PREFERRED EMBODIMENT

Figure 1:
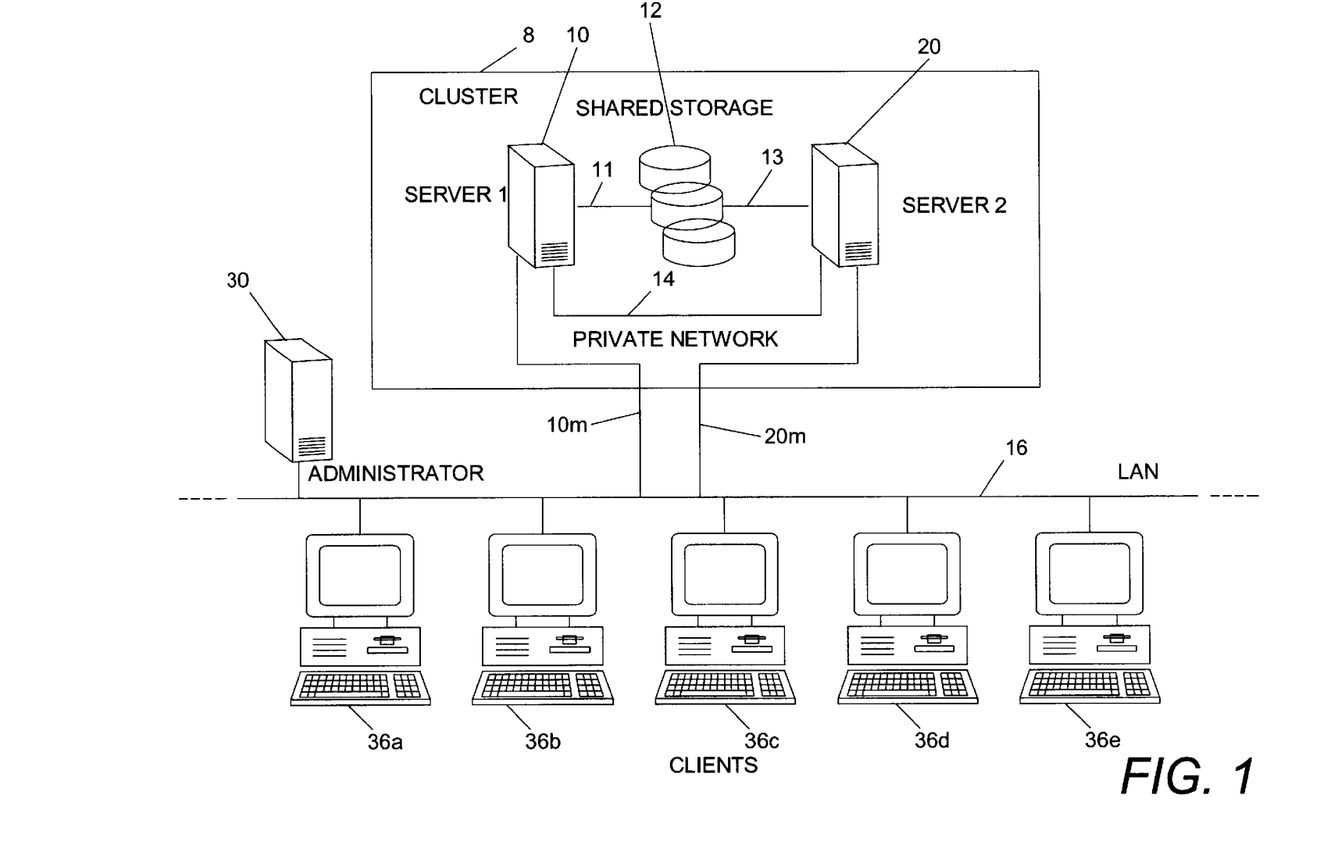
FIG. 1 is a schematic diagram of clustered computer environment.

As will be seen in FIG. 1, there is indicated the operating environment in which the present invention can be utilized.

A cluster network 8 is seen wherein a first server 10 is connected through bus 11 to a shared storage module 12 and likewise, a second server 20 is connected through bus 13 to the same shared storage module 12.

The first server 10 and the second server 20 are connected by an interconnecting bus 14.

The first server has communication lines 10m to a bus 16 which connects a Local Area Network. Likewise, the second server 20 has communication lines 20m which connect to the bus 16 and the Local Area Network.

The Local Area Network is managed by an Administrator server 30 which connects to bus 16 and onto which there are a series of client computers designated 36a, 36b . . . 36e.

Figure 2:
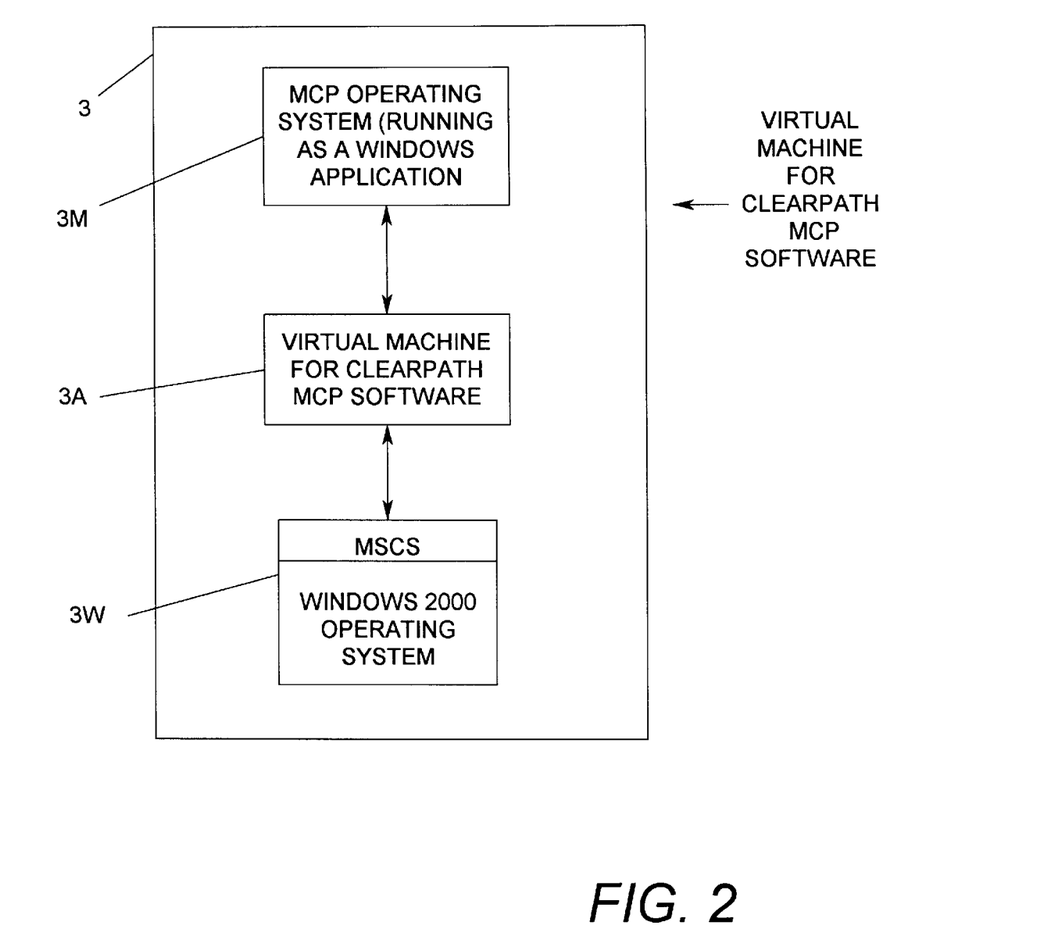
FIG. 2 is a general block diagram of the software components residing in the servers illustrated in FIG. 1.

FIG. 2 is a generalized drawing showing a typical server 3 which has a first and second operating system. For example, the first operating system 3W is the Windows 2000 operating system. The second operating system 3M is the Master Control Program operating system which can run as a Windows application.

However, because of different protocols, these systems would normally not be compatible except for the use of the Virtual Machine for ClearPath MCP software 3A which translates and interrelates the operating language of the Windows 2000 system into the Master Control Program operating system and vice-versa, that is to say, the Master Control Program operating system can be made compatible to the Windows 2000 operating system via the Virtual Machine for ClearPath MCP software 3A.

Thus, as was seen in the referenced U.S. Pat. No. 6,128,679 entitled "Computer For Executing I/O Instructions, By Emulation, In A Foreign Application Program Wherein The Emulator Result Thread Is Blocked From Running Between Processes" - - - there is seen, as for example in FIG. 4 of that patent, the operating relationship between the A-Series operating system 24 and the NT operating system 45. Here, there is used a series of emulator control threads 51, an emulator send thread 52, an emulator get thread 53, and an emulator result thread 54, whereby interoperability between the A-Series operating system 24 which operates on the Unisys Master Control Program (MCP) and the Microsoft NT operating system 45 which is a Windows 2000 operation.

The material in the next 12 paragraphs is a summary of the prior U.S. Pat. No. 6,128,679.

As indicated in U.S. Pat. No. 6,128,679, in the FIGS. 1 and 2 of that U.S. Patent, the A-Series operating system 24 and its application programs 25a–25n are not executed by emulation because they consist of A-Series object code instructions that are native to the A-Series instruction processor 22. By comparison, if the A-Series operating system and/or the application programs 25a–25n were being executed by emulation, then they would all be executed by a different instruction processor under the control of another operating system which is native to that instruction processor.

Figure 3:
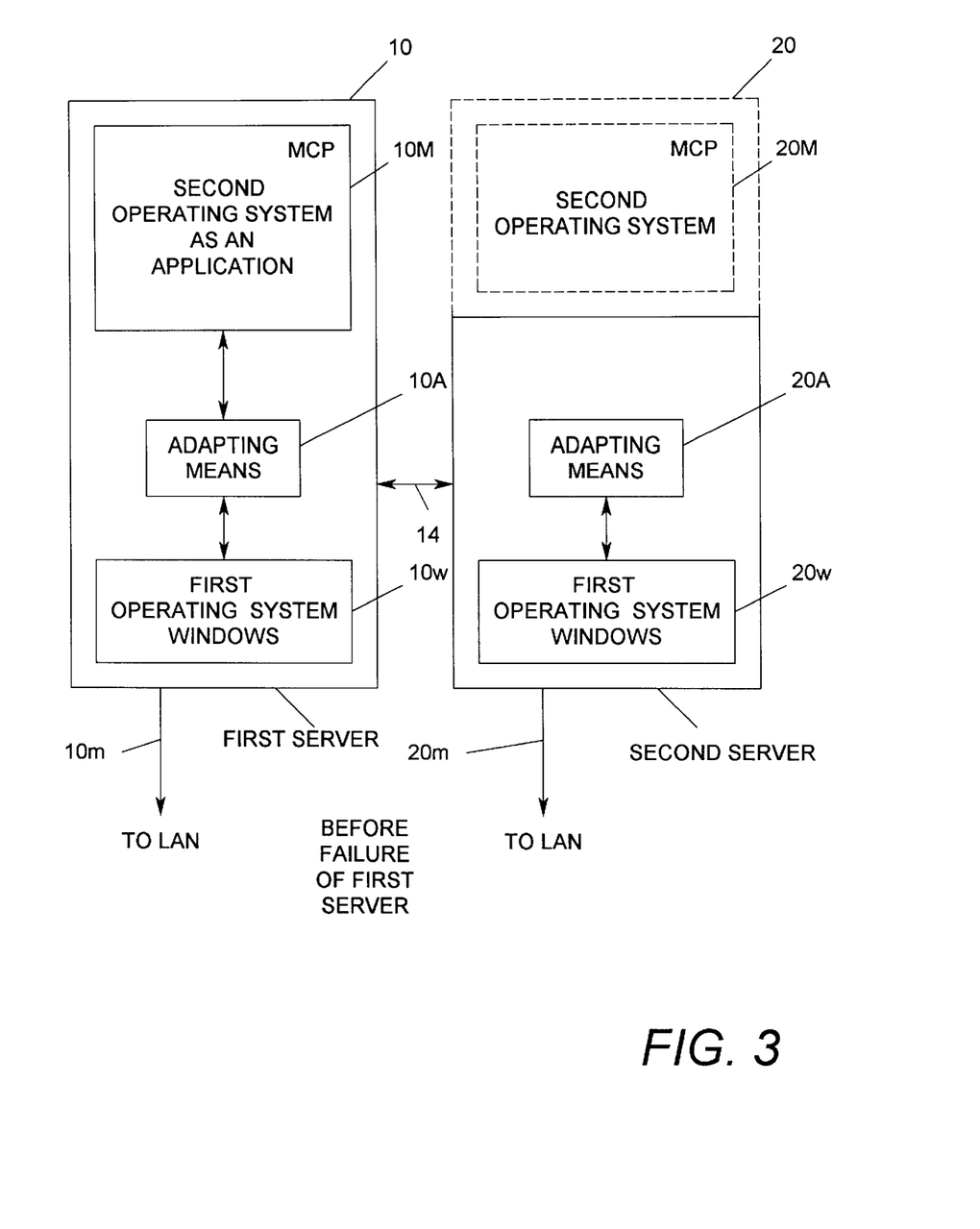
FIG. 3 is a block diagram of the specific software components residing in the servers illustrated in FIG. 1, before the first server fails.

As an example, program 15n in the x86 computer 10 could be an A-Series emulator which interprets and executes all instructions in the A-Series operating system 24 and all of the A-Series application programs 25a–25n; and this is shown in FIG. 3.

In FIG. 3, the operating system 24 and all of its application programs 25a14 25n still consist of A-Series object code instructions, and they are foreign to the x86 instruction processor 12.

Regarding to FIG. 3 of U.S. Pat. No. 6,128,679, an inspection of FIG. 3 shows that the A-Series operating system 24 no longer interfaces directly with an I/O processor. Here instead is seen in FIG. 3, the A-Series operating system 24 is separated from the I/O processor by the A-Series emulator 46n and the NT operating system 45. This separation presents a problem when the I/O instructions 26 and 27 are executed because the A-Series operating system 24 cannot interact directly with the I/O processor as it previously did in FIG. 2.

Thus, U.S. Pat. No. 6,128,679 had a primary object to provide a digital computer for executing I/O instructions by emulation, that occur in an application program that is foreign to the computer.

As a result, the incorporated U.S. Pat. No. 6,128,679 provided a digital computer which utilized the following components:

(1) An instruction processor coupled to a memory and an I/O port which directly executes a first set of object code instructions;

(2) A native operating system for all programs in the memory, which is a compilation of instructions in the first set;

(3) A foreign application program in a memory which is a compilation of instructions in a second set that differs from the first set, including a transmit I/O instruction and a receive instruction;

(4) An emulator program in the memory, which is a compilation of instructions in the first set that interprets the second set of instructions and which includes:

(a) An emulator Send thread which calls into the native operating system, to send data from the foreign application program to the I/O port in response to the transmit I/O instruction;

(b) An emulator Get thread which calls into the native operating system to receive data for the foreign application from the I/O port in response to the receive I/O instruction; and, (c) A single emulator Result thread which processes one Result descriptor from the native operating system when data is sent for the emulator Send thread and processes another Result descriptor from the native operating system when data is received for the emulator Get thread and is completely blocked from running between the processing of the result descriptors.

Additionally, as was noted in U.S. Pat. No. 6,128,679, the emulator program includes an emulator Control thread which sends a clear command to the native operating system asynchronously with respect to the transfer of the data and the emulator Result thread becomes unblocked and clears itself by receiving a Result Descriptor from the native operating system in response to the clear command. This aspect of the invention was deemed important because the execution of an I/O instruction can occur over a long period of time and by causing a Result Descriptor to be sent from the native operating system in response to the clear command, the emulator Result thread is unblocked without waiting for the execution of the I/O instruction to be completed.

As was also indicated in that cited patent, the instruction processor 43 in FIG. 3 and the operating system 45 in FIG. 3 need not respectively be the x86 instruction processor and NT operating system; but instead, they can be any instruction processor and operating system which is native to the instruction processor.

Thus, the Windows NT or Windows 2000 can operate as the host operating system software, while the Unisys Virtual Machine for ClearPath MCP software is used to emulate the proprietary hardware of Unisys A-Series systems which uses the Master Control Program and thus, the Master Control Program operating system can be run as an application on top of the Windows programs.

Further, the Virtual Machine for ClearPath MCP software has been developed as a cluster-aware application since the Microsoft Application Programming Interfaces (API's) have been incorporated into the Virtual Machine for ClearPath MCP.

The Microsoft Cluster Services (MSCS) is a part of the Windows 2000 operating system so that the installation of Windows 2000 also enables the clustering implementation during field installation so that this new arrangement allows the Master Control Program (MCP) as an "application" which can be caused to failover to a secondary server if the first server should fail.

The Master Control Program can operate in the failover situation just like any other cluster-aware application, such as Microsoft Exchange, Oracle, and other programs.

As was seen in FIG. 1, the shared storage or disk drive is shared between the two systems in the situation where one of the systems is licensed to run the Master Control Program (MCP) operating system, as it is loaded from the disk drive. Then, should any failure occur in the system which is hosting and using the MCP as an application, then the network product will automatically and transparently transfer or "failover" the MCP operating system to the second server which loads the same MCP operating system from the shared disk. Only "one licensed MCP" will be operating at any given moment.

FIG. 3 is a schematic diagram showing a first server 10 and a second server 20. It will be noted that each one of the servers has a first operating system, such as Windows 2000 and a second operating system, such as the Unisys Master Control Program, which can be utilized as an application by the first operating system of Windows 2000.

Connecting the first 10 and second 20 server is a bus 14 for intercommunication purposes and wherein each of the first and second servers has "Adapting Means" respectively designated 10a and 20a. These Adapting Means are shown to indicate the Virtual Machine software emulation systems which were designated in FIG. 2 as item 3A. These adapting means 10A and 20A operate such that they can use the Unisys Master Control Program (which is a second operating system), as an application which can be used by the first operating system of Windows 2000.

In FIG. 3, there is seen a schematic drawing of operations before any failure of the first server. Here, it will be noted that the first server has a fully-operating set of modules whereby the first operating system of Windows 10W is connected to an adapting means 10A which is connected to the second operating system or Master Control Program, 10M, which is used as an application by the first operating system.

Likewise, before any failure has occurred in the first server, it will be noticed that the second server 20 also has a first operating system 20W, such as Windows or Windows 2000, or Windows NT, designated 20W, connected to an Adapting Means, 20A. However, the second server 20 now also has a possible second operating system or Master Control Program 20M on sort of a phantom unused basis, since there has been no failure in the systems of the network.

It can be noted that the first server 10 has a communications bus 10m which connects to the Local Area Network and likewise, the second server 20 has a communications bus 20m which connects to the Local Area Network (LAN).

Figure 4:
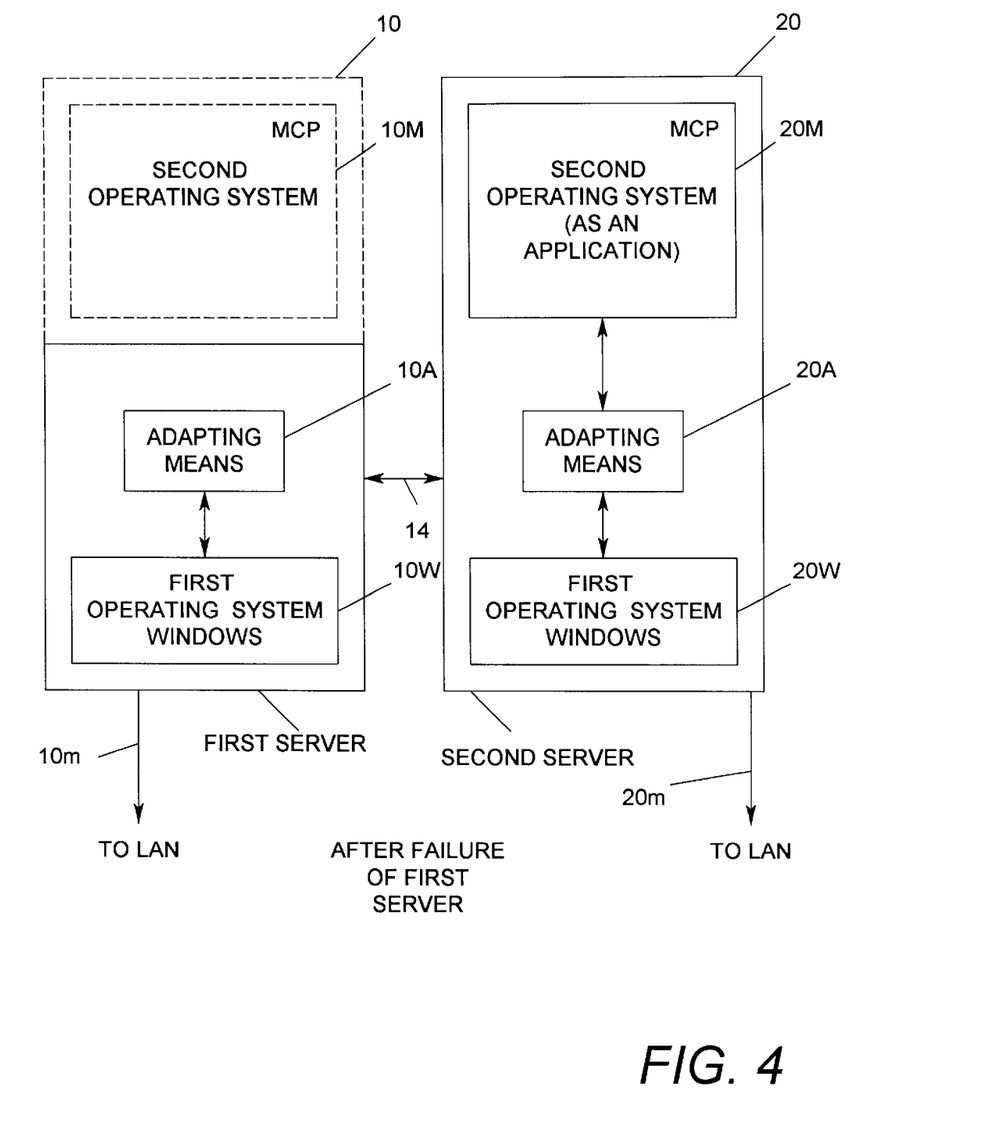
FIG. 4 is block diagram of the specific software components residing on the servers which were illustrated in FIG. 1, after the first server fails.

FIG. 4 is a schematic drawing used to illustrate the network situation after a failure has occurred in the first server. A failure in the first server is communicated to the Cluster Service on the second server via a "heartbeat" LAN connection using Bus 14 of FIG. 4. This triggers the second server to start execution of the second operating system 20M (MCP).

As seen in FIG. 4, a failure in the first server 10 will render the second operating system 10M (which had utilized the Master Control Program) into a sort of phantom non-useable operation, since the first server can no longer accommodate any interrelationship between the first operating system and the second operating system.

The lack of a heartbeat signal over bus 14 will be detected by the second server system which will cause the second operating system 20M to initiate and can now operate through Adapting Means 20A. The second operating system 20M can now operate through the adapter means 20A over to the first operating system of Windows 2000 shown as item 20W, so that the second server is now fully operational with both the first and second operating system (OS) and can continue to service the various clients 36 (FIG. 1) which will cause the second operating system 20M to initiate and can now operate through Adapting Means 20A even though the first server has now failed in its operating capability. Under these conditions, only one MCP licensed operating system is being utilized with the resultant economy of the single license MCP operating system.

Figure 5A:
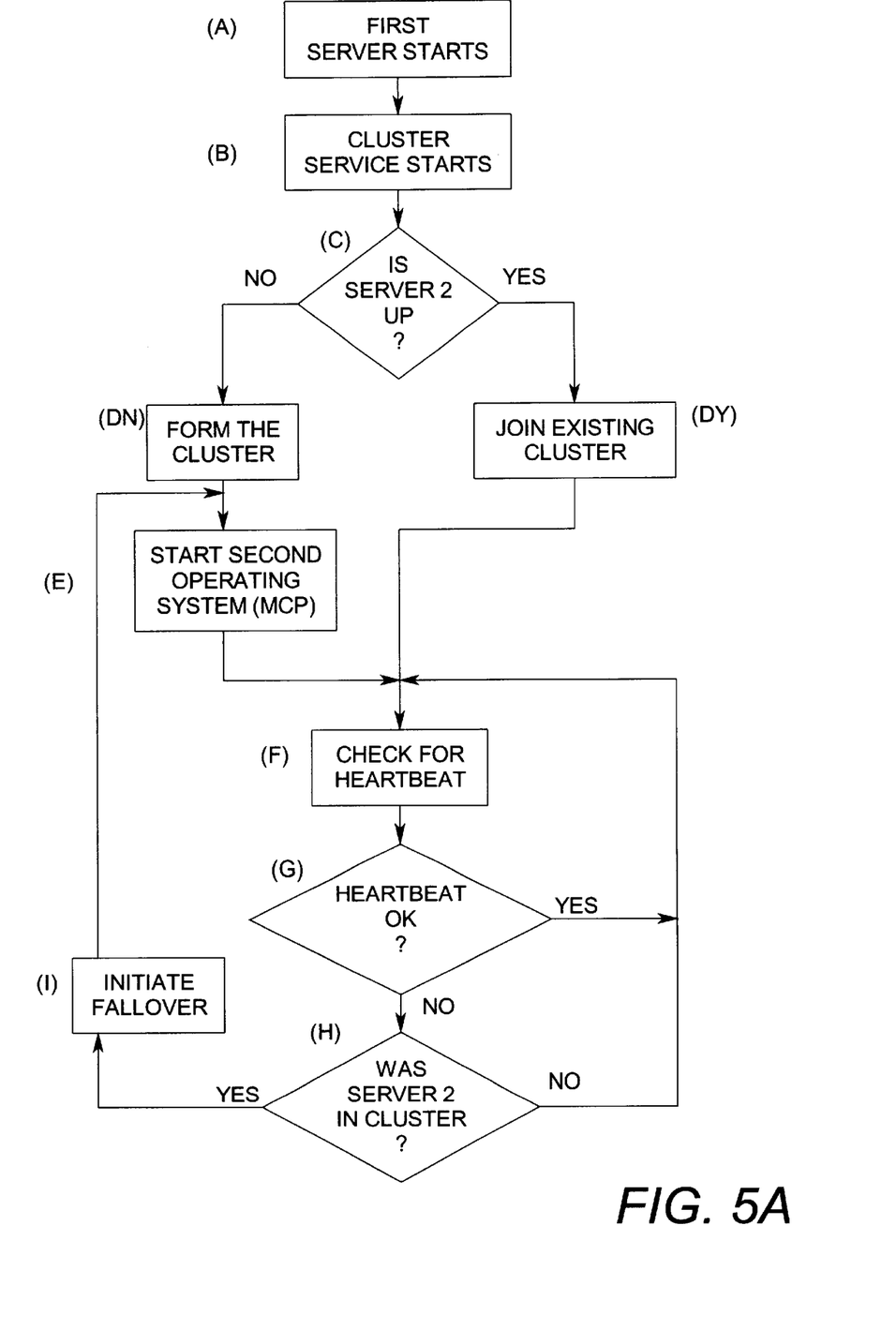
FIGS. 5A and 5B are flowcharts which illustrate the failover operations for a clustered system.
Figure 5B:
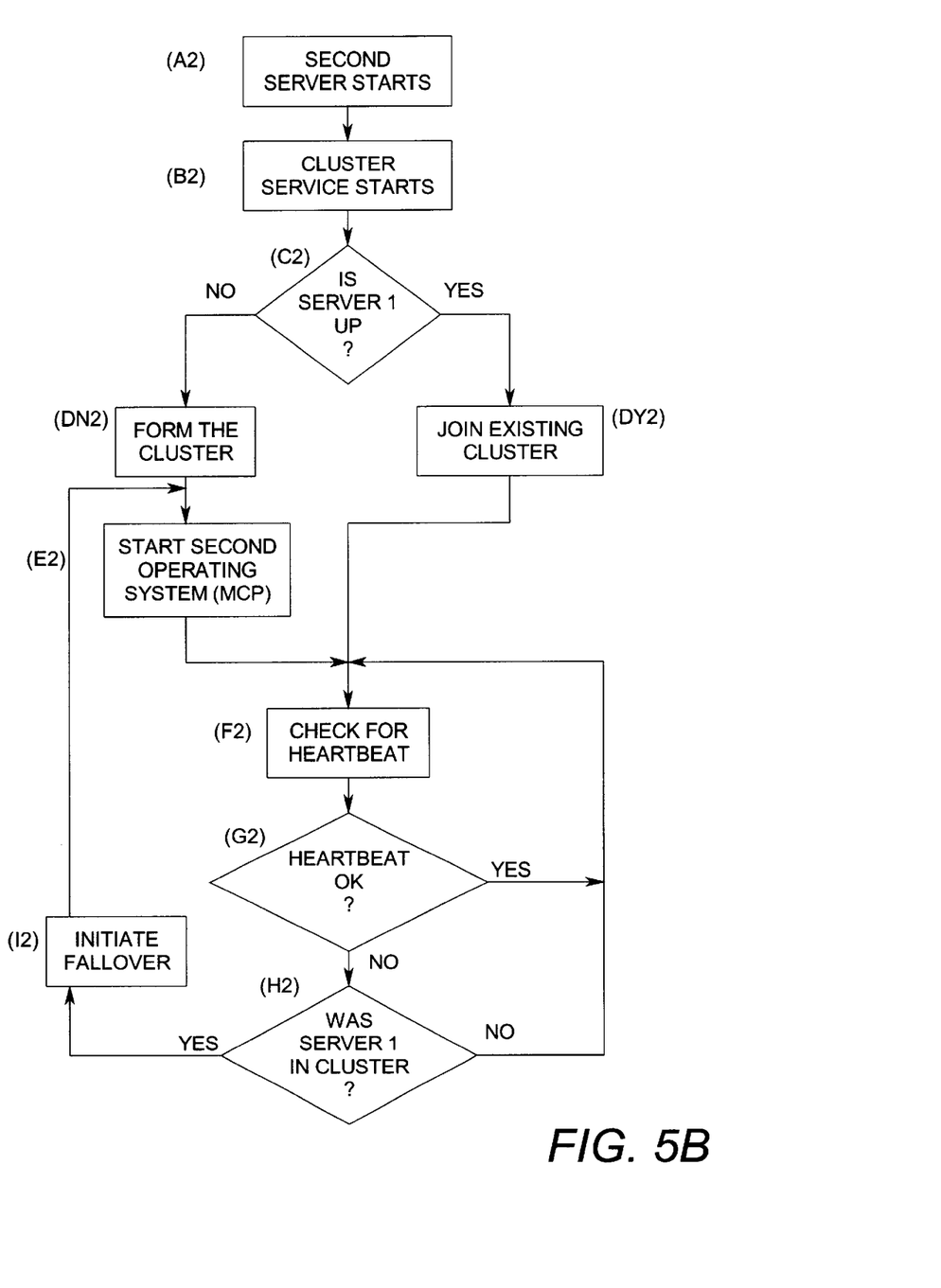

The present system will operate through a series of steps as will be delineated in the flow charts of FIGS. 5A and 5B.

Referring to FIG. 5A, at step A, the initiation or start involves the power-up of the first server wherein turning the power on will initiate the operations of the first server 10.

At step B, the cluster service will be initiated, whereby the system can now operate as a server cluster, which is a group of independent clusters managed as a single system for higher availability, easier manageability and greater scalability. This server cluster is designated as Microsoft® Cluster Server (MSCS) whereby two or more servers are connected by a network so that each server can access the other server's disk data.

At step C, a decision block is provided to settle whether or not the second server 20 is up and operating or not. Then at step DN, there is shown the "NO" leg which operates to form the cluster involved. This involves the MSCS, which is a feature initially available in the Windows NT server, Enterprise Edition. It is software that supports the connection of two servers into a "cluster" for higher availability and easier manageability of data and application. At present, Windows 2000, Advanced Server Edition supports clusters with two servers.

Returning to step C and following the "YES" leg of this decision block, it is seen that step DY operates to join the existing cluster, since the second server is already up and operating.

At step E, the next sequential step involved is the start of the second operating system, (Master Control Program). As previously mentioned, the first operating system involves Windows 2000, and the second operating system is the Master Control Program (MCP).

At step F, there is shown a provision to check for the "heartbeat". This involves getting a signal from the second server 20 to the first server 10. At this point at every 1.2 seconds, the Cluster Service is operating to send the same message that tells the first server 10 that the second server 20 is up and operating. This signal will indicate the statement that "I'm here, are you here?. The MSCS uses software "heartbeats" to detect failed applications or failed servers. In the event of a server failure, the MSCS software employs a "shared nothing" clustering architecture that automatically transfers ownership of resources (such as disk drives and IP addresses) from a failed server over to a surviving server. It then re-starts the failed server's workload on the surviving server.

If an individual application fails (but the server does not), the MSCS will typically try to restart the application on the same server; if that fails, it moves the application's resources and restarts it on the other server.

Operation of the Microsoft MSCS is described in several Microsoft publications which include: (a) *Microsoft Cluster Server Administrator's Guide, Microsoft Windows NT Server, Enterprise Edition*, published by Microsoft Corporation 1997, Document No. X0345521; and (b) *Microsoft Windows* 2000 *Server, Windows* 2000 *Clustering Technologies: Cluster Server Architecture White Paper*, published by Microsoft Corporation in the year 2000. A further relevant publication is entitled "*Microsoft Windows* 2000 *Advanced Server Getting Started*", published by Microsoft Corporation in 1999, Part No. X05-12873.

It was seen that the step F involving the check for the heartbeat came from both source lines, one from the DN leg, and one from the DY leg.

At step G, a decision block query is instituted which verifies and OK.

If the answer is "Yes, heartbeat OK", then there is a return to step F.

If the heartbeat at step G is not OK, (No), then step H provides a decision block to query whether the second server, 20 is operating in the cluster.

At step H if the answer is "NO", then a return is made back to step "F".

At step H if the answer was "YES", then the sequence goes to step I.

Thus, on the "YES" leg of step H, it indicates that server 20 is in the cluster.

At step I, upon indication that the heartbeat has "died" ("NO" in step G), it is necessary to initiate a failover. This then indicates that the second server 20 is down because there is no heartbeat, and thus the ownership of the resources now gets moved to the first server 10, so that server 10 will then operate to handle all the ongoing functions.

Now referring to FIG. 5B, there is seen a sequence of operations relevant to the second server 20. At step A2, there is the initiation or starting of the second server, that is to say, the power is "on".

At step B2, the Cluster Service starts, that is to say, the second server now has availability to various resources, such as the shared disk memory.

At step C2, a decision block poses the query as to whether the first server 10 is up or not. Here, if the answer is "NO", then step DN2 operates to form the cluster.

At step C2, if the answer is "YES", that is to say, the first server 10 is up in operation, then the process goes to step DY2, to enable the server to join the existing cluster.

At step E2, after the forming of the cluster in step DN2, then step E2 indicates the start of the second operating system, Master Control Program (MCP).

At step F2, the results of step E2 are fed to step F2 to check for a heartbeat, that is to say, to see whether the first server 10 is providing an indication of its ongoing operation to the second server 20.

At step F2, there is a decision block to further check the heartbeat signal which may indicate a "YES", at which time the sequence goes back to step F2.

At step G2, if there is not a heartbeat in operation (NO), then step H2 provides a decision block with a query asking whether the first server 10 was in the cluster.

If the answer is "YES" at step H2, then this indicates that the first server 10 was in the cluster, so that now a failover can be initiated at step I2, which then rebounds back to step E2 to start the second operating system, that is to say, the Master Control Program.

Thus, it can be seen that the first server in a sequence of operational steps can start the second MCP operating system if a failover operation is required.

Likewise, in FIG. 5B, the second server can detect the absence of a heartbeat from the first server, and as a result, initiate a failover operation, step I2, in order to go to step E2 to start the second operating system into operation. It will be noted from FIGS. 3 and 4, that before the failure of the first server, there was the Windows operating system together with a single Master Control Program as a second operating system, but only one Master Control Program was being utilized. This was seen in FIG. 3.

Now, after the failure of the first server 10, where the work and resources are being handled by the second server 20, it is seen that there is in operation, the first operating system of Windows (20W), and also the second operating system 20M of the Master Control Program. Again, in this situation after failure, there is still only one utilization of the Master Control Program, that is to say the second operating system.

Thus, in terms of licensing costs, there is only required one license for the use of one Master Control Program operating system which provides for the economy in licensing fees.

Thus, in summary, the invention provides a clustered computer system comprising a storage medium and a first operating system connected for ready access onto the storage medium. The first operating system also includes means for adapting the first operating system to run a second operating system as an application executing on top of the first operating system.

As an example, the first operating system can be chosen as one of the Windows™ family of operating systems, such as Windows™ 2000, available from the Microsoft Corporation of Redmond, Wash. The Windows™ 2000 includes the Microsoft Cluster Services (MSCS) which is an operating system utility that makes applications running under the operating system on a clustered primary server able then to failover onto a secondary server, should the primary server fail.

The second operating system may, for example, be the Unisys MCP mainframe operating system (Master Control Program) available from Unisys Corporation of Blue Bell, Pa. The MCP originated as the operating system with the so-called B-Series proprietary mainframe architecture.

The Adapting Means can be considered to be the specialized emulation software available from the Unisys Corporation and which is referenced under the name Virtual Machine for ClearPath MCP. Virtual Machine for ClearPath MCP enables the Windows™ 2000 server to emulate the B-Series proprietary hardware environment for the benefit of any MCP applications which are executing on this server.

Thus, the ClearPath MCP Virtual Machine allows the MCP operating system to execute on top of Windows™ systems like any other Windows™ application. However, this emulation is transparent to the MCP applications.

This example of use of a Windows™ 2000 operating system complete with the MSCS, operates on the first or primary server using a suitable hardware processor platform as is available from the Intel™ Corporation, or other microprocessor vendors. The first server runs the Unisys ClearPath MCP Virtual Machine product (Adapting Means) which in concert with the MSCS, enables the emulated MCP operating system to "failover" just like any other "cluster-aware" MSCS application, should the first server actually fail.

As understood by those skilled in the art, the Virtual Machine for ClearPath MCP software, or any other suitable adapting means will, upon the impending failure of the first server, save sufficient state information related to the second operating system (for example, the MCP) to enable the second operating system to boot-on the second server after the failover, and then to recover its previous state after failing over to the second server.

The first, or primary server 10, is coupled to exchange data with the storage medium 12 and will run a first instance of the first operating system 10W.

Then, at least there is a second or secondary server 20 which is coupled to also exchange data with a storage medium 12, and will run a second instance of the first operating system 20W. Here, the second server 20 is adapted to detect any failure of the first server (10) by sensing the loss of the heartbeat signal, and in response to that failure, the second server 20 is able to transfer execution of the second operating system (MCP) 20M from the first server 10 to the second server 20.

The second server 20 also has the capability of detecting a restart of the first server 10, and in response to that restart, will return the execution of the second operating system (MCP) from the second server to the first server 10. The second server 20 detects that the first server 10 has restarted due to the resumption of its heartbeat signal.

Accordingly, at any one given point in time, the second (MCP) operating system will be seen to be executing on only one server, that is to say, either on the first server or on the second server. As previously mentioned, if the second operating system (for example the MCP is licensed on a single-server or a single-CPU basis), then a clustered computer system constructed according to this invention described herein, will then enable the second operating system (MCP) to be used in a clustered environment consistent with the terms of such a license which involves a license on a single server or a single-CPU basis.

The invention can be considered as a method of managing a clustered computer system which would involve the following steps:

(a) executing a first operating system on a first server and a second server;

(b) executing a second operating system on the first server as an application running under the first server;

(c) detecting a failure of the first server;

(d) in response to the failure, transferring execution of the second operating system from the first server to the second server;

(e) detecting a restart of the first server;

(f) in response to the restart of the first server, then returning execution of the second operating system from the second server back to the first server; and (g) whereby at any one moment of time, the second operating system is executing on only one server of either the first server or the second server.

Additionally, this invention provides a shared storage medium 12 containing executable code that is readable by a computer and that programs the computer to perform the above-listed method steps for managing a clustered computer system. The storage medium 12 can refer to any type of medium that is readable or writable by a computer whether it is implemented as semi-conductor memory or magnetic disk drive, or may also include such items as tapes, disks, disks and hard drives or floppy drives, whether they are installed in personal computers, network servers, or Web servers, CD-ROMs, and all forms of RAM or ROM memory.

While a preferred embodiment of the subject invention has been described in certain specific and sometimes general terms, it should be understood that the invention may be embodied in other forms and systems which are still encompassed by the following claims.

What is claimed is:

1. A storage medium containing executable code that is readable by a computer and that programs the computer to perform method steps comprising:

(a) executing a first operating system on a first server and a second server;

(b) executing a second operating system on said first server as an application running under said first server;

(c) detecting a failure of said first server;

(d) in response to the failure, transferring execution of said second operating system from said first server to said second server;

(e) detecting a restart of said first server;

(f) in response to the restart, returning execution of said second operating system from said second server to said first server; and (g) whereby at any one time, said second operating system is executing on only one of said first or second servers.

2. In a clustered server network which utilizes a common storage means, a system for limiting utilization of one operating system and for switching operations from a first server to a second server upon failure of said first server comprising:

(a) a first server means having a first operating system and a second operating system connected by a first adapting means;

(b) a second server means having a duplicate first operating system and a duplicate second operating system connected by a duplicate second adapting means;

(c) said first and second adapting means for enabling said first operating system to utilize said second operating system as an application;

(d) limiting means to insure that said second operating system can be utilized by only one of said first or second server means at any point in time.

3. A system for managing a clustered server network having first and second server means, each of which has first and second operating systems, comprising:

(a) storage means providing common storage functions to said first and said second server means;

(b) said first and second operating systems being utilized in each of said first and second server means;

(c) adapter means in each of said first and second server means for enabling each of said first operating systems to utilize said second operating system as an application;

(c) interconnecting means between said first and second server means for transferring operations from said first server means to said second server means upon failure of said first server means;

(d) means to limit utilization of said second operating system for use in only one of said first and second server means at any given time.

4. A clustered computer system comprising:

(a) a storage medium;

(b) a first operating system being stored on said storage medium and including means for adapting said first operating system to run a second operating system as an application executing on top of said first operating system;

(c) a first server being coupled to exchange data with said storage medium, and running a first instance of said first operating system and running said second operating system as an application under said first operating system;

(d) a second server being coupled to exchange data with said storage medium and running a second instance of said first operating system and being adapted to:

(d1) detect a failure of said first server;

(d2) in response to said failure, transfer execution of said second operating system from said first server to said second server;

(d3) detect a restart of said first server;

(d4) in response to the restart, return execution of said second operating system from said second server to said first server; and (e) whereby at any one time, said second operating system is executing on only one of either said first server or said second server.

* * * * *